(12) United States Patent
Kakizaki et al.

(10) Patent No.: US 6,754,247 B2
(45) Date of Patent: Jun. 22, 2004

(54) ARF EXCIMER LASER DEVICES, KRF EXCIMER LASER DEVICES AND FLUORINE ALSER DEVICES

(75) Inventors: Koji Kakizaki, Oyama (JP); Akifumi Tada, Oyama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 84 days.

(21) Appl. No.: 09/803,983

(22) Filed: Mar. 13, 2001

(65) Prior Publication Data

US 2001/0022799 A1 Sep. 20, 2001

(30) Foreign Application Priority Data

Mar. 15, 2000 (JP) ......................................... 2000-072201

(51) Int. Cl.[7] ................................................ H01S 3/22
(52) U.S. Cl. ........................................................ 372/57
(58) Field of Search ...................... 372/57, 38.02–38.07

(56) References Cited

U.S. PATENT DOCUMENTS

| | | | | |
|---|---|---|---|---|
| 4,837,773 A | * | 6/1989 | Wakata et al. ................. | 372/86 |
| 4,876,693 A | * | 10/1989 | Lucero et al. ................. | 372/82 |
| 5,260,961 A | * | 11/1993 | Zhou et al. .................... | 372/57 |

(List continued on next page.)

FOREIGN PATENT DOCUMENTS

| | | |
|---|---|---|
| EP | 1 085 623 | 3/2001 |
| EP | 1 091 462 | 4/2001 |
| EP | 1 111 744 | 6/2001 |
| JP | 63-110780 | 5/1988 |
| JP | 2001-111142 | 4/2001 |
| JP | 2001-156367 | 6/2001 |
| JP | 2001-177172 | 6/2001 |

OTHER PUBLICATIONS

Hidekazu, Hatanaka et al., "High Efficiency Operation of the High–Repetition–Rate All–Solid–State Magnetic Pulse Compressor for KrF Excimer Lasers", Measurement Science and Technology, Bristol, GB, vol. 2, No. 1, 1991, pp. 42–48.

Shimada, Tsutomu et al., "An All Solid–State Magnetic Switching Exciter for Pumping Excimer Lasers", Review of Scientific Instruments, American Institute of Physics, New York, US, vol. 56, No. 11.

European Search Report Dated Oct. 13, 2003.

Performance Characteristics of Ultra–Narro ArF Laser for DUV Lithography, Alex Ershov et al., SPIE vol. 3679, Mar. 1999, pp. 1030–1037.

High Repetition Rate Excimer Lasers for DUV Lithography, U. Stamm et al., SPIE vol. 3679, Mar. 1999, pp. 1050–1057.

Mituo Maeda, "Excimer Laser", pp. 62–65, Aug. 20, 1993, (with English translation).

*Primary Examiner*—Paul Ip
*Assistant Examiner*—James Menefee
(74) *Attorney, Agent, or Firm*—Nixon Peabody LLP; David S. Safran

(57) ABSTRACT

To provide an ArF excimer laser device capable of a pulsewidth FWHM of 20 ns or more, a pulse duration time of 50 ns or more, and a spectrum line width FWHM of 0.35 pm or less, and to provide a KrF excimer laser device and a fluorine laser device with stretched pulse widths. The ArF excimer laser device connects to the output terminal of a magnetic pulse compression circuit and has a pair of laser discharge electrodes located within the laser chamber and a peaking capacitor connected in parallel with the pair of laser discharge electrodes. The output waveform of the laser pulse has a bifurcated form with a front half peak and a later half peak and, if the peak value of the front half peak is $P_1$ and the peak value of the later half peak is $P_2$ and the (proportion of the pulse later half peak)=$P_2/(P_1+P_2) \times 100(\%)$, then the (proportion of the pulse later half peak) is 50% or more.

15 Claims, 11 Drawing Sheets

U.S. PATENT DOCUMENTS

| | | | | |
|---|---|---|---|---|
| 5,267,253 A | * | 11/1993 | Nakatani | 372/38.05 |
| 5,305,338 A | * | 4/1994 | Wakata et al. | 372/38.03 |
| 5,305,339 A | * | 4/1994 | Nakatani et al. | 372/38.05 |
| 5,309,462 A | * | 5/1994 | Taylor et al. | 372/39.03 |
| 5,835,520 A | | 11/1998 | Das et al. | |
| 5,856,991 A | | 1/1999 | Ershov | |
| 5,936,988 A | * | 8/1999 | Partlo et al. | 372/38.04 |
| 6,188,144 B1 | * | 2/2001 | Kawasuji | 372/38.08 |
| 6,269,110 B1 | * | 7/2001 | Leinhos et al. | 372/57 |
| 6,400,741 B1 | * | 6/2002 | Matsunaga et al. | 372/38.02 |
| 6,636,546 B2 | * | 10/2003 | Kakizaki et al. | 372/57 |
| 2001/0004371 A1 | * | 6/2001 | Kakizaki et al. | 372/57 |

* cited by examiner

ARF EXCIMER LASER DEVICES, KRF EXCIMER LASER DEVICES AND FLUORINE ALSER DEVICES

BACKGROUND OF THE INVENTION

1. Field of the Invention

This invention relates to gas laser devices that emit ultraviolet light, and particularly KrF excimer laser devices, ArF excimer laser devices and fluorine laser devices in which the laser operation has a long laser oscillation pulsewidth.

2. Description of Related Art

With the miniaturization of and the high degree of integration of semiconductor integrated circuits, greater resolution has been demanded of the projection exposure equipment used in their fabrication. For that reason, the wavelengths of light emitted from exposure light sources have become increasingly shorter. At present, KrF excimer laser devices with a shorter wavelength of the beam than the wavelength of the light emitted from mercury lamps are used as semiconductor exposure light sources. However, gas laser devices that emit ultraviolet rays, such as ArF excimer laser devices and fluorine laser devices, are promising candidates for the next generation of semiconductor exposure light sources.

The gas laser devices mentioned above use a mixed gas comprising fluorine gas ($F_2$), krypton gas (Kr) and a rare gas such as neon (Ne) as a buffer gas, or in the case of ArF excimer devices, a mixed gas comprising fluorine gas ($F_2$), argon gas (Ar) and a rare gas such as neon (Ne) as a buffer gas, or in the case of fluorine laser devices, a mixed gas comprising fluorine gas ($F_2$) and a rare gas such as helium (He) as a buffer gas. The mixed gas is sealed in the laser chamber at a pressure of several hundred kPa, and an electrical discharge is used to excite the laser gas, which is a laser medium.

The central oscillation wavelength of an ArF excimer laser device is 193.3 nm, which is shorter than the 248 nm central oscillation wavelength of a KrF excimer laser device. For this reason, the damage done to the quartz glass used in the projection lens systems of exposure equipment such as steppers is greater than in the case of KrF excimer lasers, and the reduced service life of the lens system is a problem.

The damage done to the quartz is in the form of color centers and compaction (increased index of refraction) formed by two-photon absorption. The former is manifest as a reduced index of transmission and the latter as a reduction of the lens system's capacity for resolution. Effects of that sort can be avoided by stretching the laser pulse width (pulse stretching). Now, this pulse stretch is desirable for the following reason.

In projection exposure equipment, the image of the mask that implements the circuit pattern is projected through the projection lens onto the workpiece, such as a wafer coated with photoresist. The resolution R and depth of focus DOF are expressed in the following formulas.

$$R = k_1 \cdot \lambda / NA \quad (1)$$

$$DOF = k_2 \cdot \lambda / (NA)^2 \quad (2)$$

where $k_1$ and $k_2$ are coefficients that reflect characteristics of the resist, $\lambda$ is the wavelength of the exposure light emitted by the exposure light source, and NA is the numerical aperture.

In order to increase the resolution R, as is clear from formula (1), a shorter wavelength of the exposure light and a higher NA are selected, but to the extent that is done, the depth of focus DOF becomes smaller, as shown in formula (2). Because that increases the chromatic aberration effect, it is necessary to narrow the spectrum line width of the exposure light. In other words, it is necessary to further narrow the spectrum line width of the laser ray emitted by the gas laser device.

It has been reported in Proc. SPIE Vol. 3679, (1999) 1030–1037 that stretching the laser pulse width narrows the spectrum line width of the laser ray. This effect has been verified in experiments by the present inventors. In other words, to raise the resolution R, the spectrum line width of the laser light must be narrowed, and that requires stretching of the laser pulsewidth.

With the backdrop noted above, in Japanese Patent Application H11-362688, the present applicant proposed, as a means to stretch the pulsewidth, an ArF excimer laser device connected to the output terminal of a magnetic pulse compression circuit. The laser device having within the laser chamber a pair of laser discharge electrodes and a peaking capacitor connected in parallel to the pair of laser discharge electrodes. In the laser device, the primary current that injects energy from the magnetic pulse compression circuit through the peaking capacitor into the discharge electrodes and the secondary current that injects energy into the discharge electrodes from the capacitor used to charge the peaking capacitor in the final stage of the magnetic pulse compression circuit are combined. The oscillation period of the secondary current is set longer than the oscillation period of the primary current.

Proc. SPIE Vol. 3679, (1999) 1050–1057 provides a well known example of a laser pulse output waveform with the FWHM (measurement of the full width of the pulse at one half the maximum amplitude) measured at 30 ns or more.

In general, when the pulsewidth FWHM is stretched, the number of round trips in the optical resonator (times the laser beam travels back and forth within the optical resonator) increases, and the spectrum line width narrows.

According to Proc. SPIE Vol. 3679, (1999) 1030–1037, the spectrum line width can be made narrower when, at a given pulse width, the relative intensity of the latter half of the pulse is increased. Hence, this paper describes the relationship between spectrum line width and the variations in the laser pulse waveform caused by varying the concentration of fluorine (in waveforms with FWHM in the 20 ns range).

Aside from the pulse stretching mentioned above, JPO Kokai Patent H11-8431 proposed the use of an etalon coupler in the optical resonator as a method of narrowing to 0.4 pm or less.

Now, fluorine laser devices with a pulsewidth FWHM of 12 ns or less are well known.

In the ArF excimer laser device introduced in Proc. SPIE Vol. 3679, (1999) 1030–1037, however, the pulsewidth FWHM was in the 20 ns range, and the line width was reduced to 0.4 pm by lowering the oscillation efficiency. Because reducing the concentration of fluorine also lowers the output, there are limits to how much the line width of a long pulse can be narrowed by means of the concentration of fluorine.

Using an etalon coupler, as proposed in the JPO Kokai Patent H11-8431, also produces high technical barriers, such as difficulties in controlling the central wavelength.

SUMMARY OF THE INVENTION

The primary object of the invention is to obviate the problems noted above in the prior technology. In particular, the purpose of the present invention is to introduce a method of varying the laser pulse waveform to the method of pulse stretching proposed by the present applicant. As such, the present invention may utilize an ArF excimer laser device for exposure that is capable of a pulsewidth FWHM of 20 ns or more, a pulse duration of 50 ns or more, and a spectrum line width FWHM of 0.35 pm or less. The present invention may also use a KrF excimer laser device and a fluorine laser device with pulses stretching beyond the conventional width by introduction of such a method.

This object is achieved in accordance with the invention in that the ArF excimer laser device of this invention is one which connects to the output terminal of a magnetic pulse compression circuit and includes a pair of laser discharge electrodes located within the laser chamber and a peaking capacitor connected in parallel with the pair of laser discharge electrodes, wherein the output waveform of the laser pulse has a bifurcated form comprising a front half peak and a later half peak. If the peak value of the front half peak is $P1$ and the peak value of the later half peak is $P2$ and the (proportion of the pulse later half peak)$=P2/(P1+P2)\times100$ (%), then the (proportion of the pulse later half peak) is 50% or more.

In this case, it is preferable that the primary current that injects energy from the magnetic pulse compression circuit through the peaking capacitor into the discharge electrodes and the secondary current that injects energy into the discharge electrodes from the capacitor used to charge the peaking capacitor in the final stage of the magnetic pulse compression circuit are combined. In addition, the oscillation cycle of the secondary current is set at three to six times the oscillation cycle of the primary current, such that the first half cycle of the discharge oscillation current waveform of the primary current combined with the secondary current when it reverses polarity, and at least the succeeding two half cycles form one pulse of laser oscillation activity.

Moreover, it is preferable that the FWHM of the laser pulse output waveform be 20 ns or longer, and that the duration of the output laser pulse be 50 ns or longer.

Also, it is desirable that the number of round trips in the optical resonator be five or more.

In addition, it is preferable that the magnetic pulse compression circuit have a magnetic pulse compression section comprising a semiconductor switch and one or more stages of capacitor and magnetic switch, and that the capacitance $Cp$ of the peaking capacitor and the capacitance $Cn$ of the capacitor that charges the peaking capacitor in the final stage of the magnetic pulse compression circuit be in a proportion such that $Cp/Cn$ does not exceed 0.75.

Preferably, the partial pressure of Ar in the laser chamber should be 3% or less.

Furthermore, it is preferable that the total gas pressure in the laser chamber be 3.5 atmospheres or less.

Additionally, it is preferable that the inter-electrode gap of the discharge electrodes be no more than 17 mm.

Further, it is preferable that the reflectivity of the output mirror of the optical resonator located in the laser chamber exceed 50%.

Still, it is preferable that in the above, more specifically, the magnetic pulse compression circuit have a magnetic pulse compression section comprising a semiconductor switch and one or more stages of capacitor and magnetic switch. The inductance of the circuit loop comprising the peaking capacitor and the main discharge electrodes should be from 4 to 8 nH, the total gas pressure in the laser chamber should be from 2.5 to 3.7 atmospheres, the partial pressure of fluorine should be no more than 0.1%, and the rise time until breakdown of the voltage impressed on the main discharge electrodes should be from 30 to 80 ns. Additionally, the capacitance $Cp$ of the peaking capacitor and the capacitance $Cn$ of the capacitor that charges the peaking capacitor in the final stage of the magnetic pulse compression circuit should be in a proportion such that $0.45<Cp/Cn<0.75$.

Likewise, it is preferable that the capacitance $Cp$ of the peaking capacitor be less than 10 nF.

In another embodiment of the invention, the fluorine laser device of this invention is one which connects to the output terminal of a magnetic pulse compression circuit and has a pair of laser discharge electrodes located within the laser chamber and a peaking capacitor connected in parallel with the pair of laser discharge electrodes, wherein the output waveform of the laser pulse has a bifurcated form comprising a front half peak and a later half peak and, if the peak value of the front half peak is $P1$ and the peak value of the later half peak is $P2$ and the (proportion of the pulse later half peak)$=P2/(P1+P2)\times100$(%), then the (proportion of the pulse later half peak) is 50% or more.

In this case, it is preferable that the primary current that injects energy from the magnetic pulse compression circuit through the peaking capacitor into the discharge electrodes and the secondary current that injects energy into the discharge electrodes from the capacitor used to charge the peaking capacitor in the final stage of the magnetic pulse compression circuit are combined, and the oscillation cycle of the secondary current is set at three to six times the oscillation cycle of the primary current, such that the first half cycle of the discharge oscillation current waveform of the primary current combined with the secondary current when it reverses polarity, and at least the succeeding two half cycles form one pulse of laser oscillation activity.

In still another embodiment of the present invention, the KrF excimer laser device of this invention is one which connects to the output terminal of a magnetic pulse compression circuit and which has a pair of laser discharge electrodes located within the laser chamber and a peaking capacitor connected in parallel with the pair of laser discharge electrodes, wherein the output waveform of the laser pulse has a bifurcated form comprising a front half peak and a later half peak and, if the peak value of the front half peak is $P1$ and the peak value of the later half peak is $P2$ and the (proportion of the pulse later half peak)$=P2/(P1+P2)\times100$ (%), then the (proportion of the pulse later half peak) is 50% or more.

In this case, it is preferable that the primary current that injects energy from the magnetic pulse compression circuit through the peaking capacitor into the discharge electrodes and the secondary current that injects energy into the discharge electrodes from the capacitor used to charge the peaking capacitor in the final stage of the magnetic pulse compression circuit are combined, and the oscillation cycle of the secondary current is set at three to six times the oscillation cycle of the primary current, such that the first half cycle of the discharge oscillation current waveform of the primary current combined with the secondary current, when it reverses polarity, and at least the succeeding two half cycles form one pulse of laser oscillation activity.

In this invention, the output waveform of the laser pulse has a bifurcated form comprising a front half peak and a later half peak and, if the peak value of the front half peak is $P1$ and the peak value of the later half peak is $P2$ and the (proportion of the pulse later half peak)=P2/(P1+P2)×100 (%), then the (proportion of the pulse later half peak) is 50% or more. Therefore, in the ArF excimer laser device with the stretched pulse, it is possible to realize an exposure beam in which the spectrum line width FWHM is no more than 0.35 pm. It is also possible to obtain shorter than usual spectral line widths in the KrF excimer laser devices and the fluorine laser devices.

DETAILED DESCRIPTION OF THE INVENTION

The principles of this invention and an implementation are explained below, with reference to the drawings.

As for the principles, the specific operation of the pulse stretching circuit is to hasten the rise and heighten the peak of the primary current that flows in the discharge space from the peaking capacitor connected in parallel to the pair of laser discharge electrodes located in the laser chamber, and to shorten the cycle of the primary current and to easily stabilize and maintain the discharge. By joining the second cycle of the primary current that flows in the discharge space from the peaking capacitor with the charge remaining in the capacitor used to charge up the peaking capacitor of the magnetic pulse compression circuit (the portion not transferred to the peaking capacitor before discharge), the first half cycle of the discharge oscillation current waveform that reverses the polarity and at least the succeeding two half cycles make up the laser oscillation operation.

Figure 1:
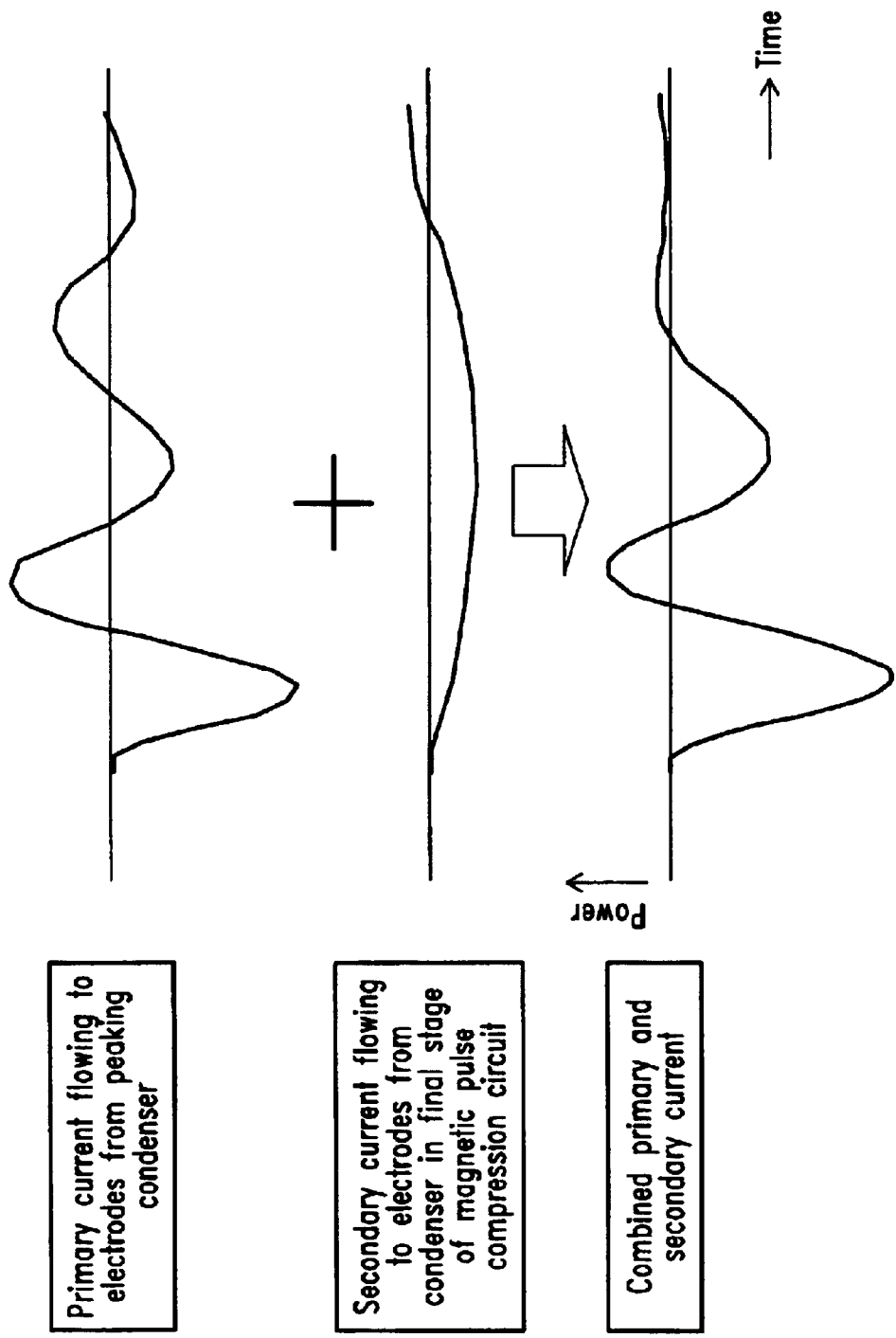
FIG. 1 is a waveform diagram to explain principle of the ArF excimer laser device of this invention.

FIG. 1 is a concept drawing of the above noted state. By determining the circuit constants that hasten the rise of the primary current flowing from the peaking capacitor, increasing the peak value and shortening the cycle (specifics of the circuit structure and circuit constants are discussed below), the discharge is easily stabilized and maintained.

The circuit constants are set so that at the time of discharge, a charge will remain in the capacitor (the final stage capacitor) that charges the peaking capacitor of the magnetic pulse compression circuit (specifics of the circuit structure and circuit constants are discussed below). The settings make the period of the secondary current when the residual charge flows through the discharge space longer (by a factor of 3 to 6) than the period of the primary current.

The current that flows between the discharge electrodes is a combination of the primary current and the secondary current; as shown in FIG. 1. The laser oscillation action depends on the first half cycle and at least the two succeeding half cycles of the combined current which polarity reverses.

As a supplementary explanation, in FIG. 1 the combined current has the same polarity in the 1st half cycle and the 3rd half cycle, and the strength of the combined current is increased. The energy injected into the discharge space is greater than in the conventional case where there is no secondary current, and the oscillation energy is also greater. In the 2nd half cycle of oscillation current, however, the current value is smaller, therefore, the energy injected is reduced. But even in this case, the discharge continues even though the polarity reverses following the 1st half cycle, and the energy is injected efficiently. Therefore, it is possible for the laser oscillation action to continue from the 1st half cycle through the 2nd, and then the 3rd half cycle.

Thus, the primary current that injects energy from the magnetic pulse compression circuit through the peaking capacitor into the discharge electrodes is combined with the secondary current that injects energy into the discharge electrodes from the capacitor for charging the peaking capacitor of the magnetic pulse compression circuit. The oscillation period of the secondary current is set longer than the oscillation period of the primary current, and the constitution is such that the laser oscillation action depends on the first half cycle and at least the two succeeding half cycles of the combined current which polarity reverses. This make it possible to stretch the pulsewidth $T_{is}$ to 40 ns, narrow the line width from 0.5 pm (half value), increase the resolution and, by stretching the pulse in this way, reduce the peak beam intensity and lessen damage to the quartz material.

The pulsewidth $T_{is}$ is defined by formula (3) below.

$$T_{im}=(\int T(t)dt)^x / \int (T(t))^x dt \quad (3)$$

where T(t) is the instantaneous laser waveform.

Figure 2:
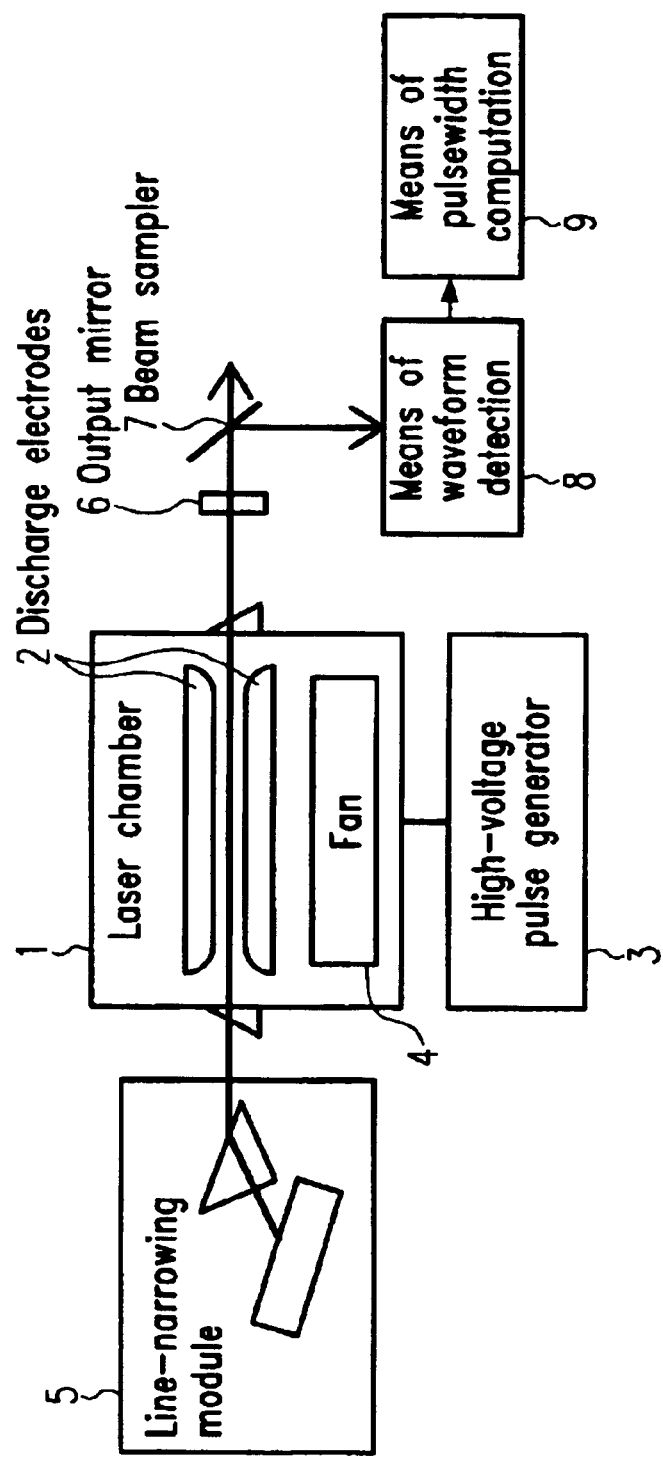
FIG. 2 is a drawing of structure of the ArF excimer laser device applying this invention.

FIG. 2 is a drawing of the structure of an ArF excimer laser device applying this invention that is described below. In FIG. 2, 1 is the laser chamber. There are windows in both ends, and the chamber is filled with a mixed gas comprising fluorine gas, argon gas and a buffer gas (neon gas, for example).

Within the laser chamber 1 is a pair of discharge electrodes 2, 2 facing across a specified gap. A high-voltage pulse from the high-voltage pulse generator 3 is impressed on the discharge electrodes 2,2 and a discharge occurs, causing excitation of the laser gas that is the laser medium. The laser gas is circulated within the laser chamber by a fan 4 that is set within the laser chamber 1.

Because of this circulation of laser gas, the laser gas between the discharge electrodes 2 is replaced by new gas after the discharge occurs and before the next discharge occurs, and so the next discharge is a stable discharge.

The present inventors have improved the mode of circulation of the laser gas in the laser chamber 1, and the shape of the fan 4, and have achieved repetition rates of 2 kHz and above.

At one end of the laser chamber 1 is a line-narrowing module that has an optical system to narrow the spectrum line width of the laser ray. The line-narrowing module 5 can be made up of, for example, a beam-expanding optical system of one or more prisms, and a Littrow reflective diffraction grating. An output mirror 6 is located at the other end of the laser chamber 1. This output mirror 6 and the line-narrowing module 5 constitute the laser resonator.

A portion of the ArF excimer laser beam that emerges from the output mirror 6 is extracted by a beam sampler 7 and is guided to a means of waveform detection 8 that detects the waveform of the laser beam over time. The means of waveform detection 8 can use, for example, photodiodes or photomultiplier tubes. The waveform data obtained by the means of waveform detection 8 is passed to a means of pulsewidth computation 9. On the basis of the pulsewidth data received, the means of pulsewidth computation 9 computes the laser pulsewidth $T_{is}$ in accordance with formula (3).

Figure 3:
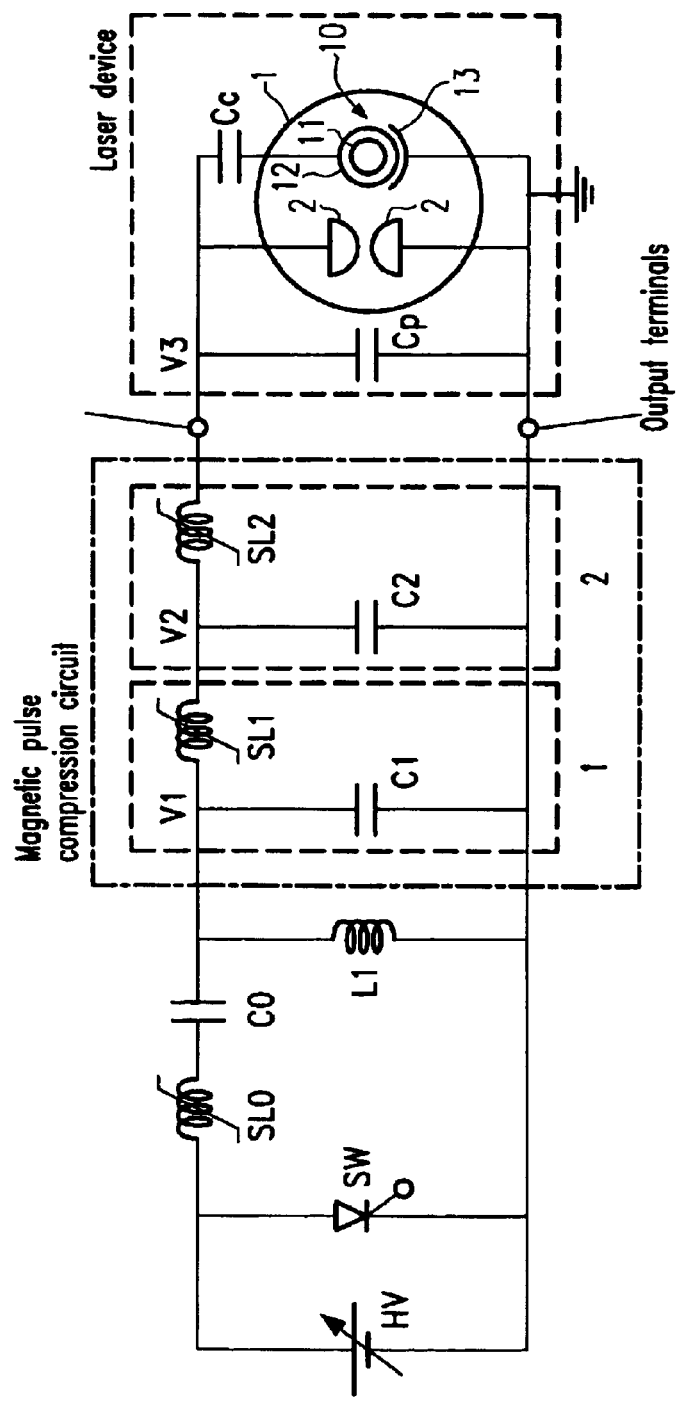
FIG. 3 is a circuit diagram showing example of excitation circuit based on this invention.

Across the main discharge electrodes 2, 2 of this ArF excimer laser device there is a main discharge voltage from an exciter circuit, such as that shown in FIG. 3. A pre-ionization discharge voltage is also impressed across the electrodes 11 and 13 of a corona pre-ionization section 10, through the pre-ionization capacitor Cc. Now, in this example, the corona pre-ionization section 10 is constituted with a 1st electrode 11, which is a cylindrical electrode inserted into a tube 12 made of a dielectric substance such as high-grade alumina ceramics and open on one end, and a 2nd electrode 13 that is a rectangular plate electrode, with the plate of the 2nd electrode curved at one edge; at this edge there is a line of contact parallel to the outer surface of the dielectric tube 12 of the 1st electrode 11. The position of contact is located close to one side of the main discharge electrode 2 at a point with access to the laser excitation space between the main discharge electrodes 2, 2.

The excitation circuit in FIG. 3 has a two-stage magnetic pulse compression circuit that uses three magnetic switches SL0, SL1 and SL2 that are saturable reactors. The magnetic switch SL0 is used to protect a solid-state switch SW, and the 1st magnetic switch SL1 and the 2nd magnetic switch SL2 make up the two stage magnetic pulse compression circuit.

The structure and operation of the circuit is explained here following FIG. 3. First, the voltage from the high-voltage power source HV is controlled at a specified level. It passes through the magnetic switch SL0 and an inductance L1 to charge the main capacitor C0. At that time, the solid-state switch SW is turned off. When charging of the main capacitor C0 is completed and the solid-state switch SW is turned on, the voltage across the terminals of the solid-state switch SW is shifted to the terminals of the magnetic switch SL0 to protect the solid-state switch SW. If the time quadrature value of the charging voltage V0 of the main capacitor C0 on the magnetic switch SL0 reaches the threshold value determined by the characteristics of the magnetic switch SL0, then the magnetic switch SL0 saturates and the magnetic switch turns on; current flows through the loop of the main capacitor C0, the magnetic switch SL0, the solid-state switch SW and the capacitor C1, and the charge stored in the main capacitor C0 charges up the capacitor C1.

Then, when the time quadrature value of voltage V1 in capacitor C1 reaches the threshold value determined by the characteristics of the magnetic switch SL1, then the magnetic switch SL1 saturates and the magnetic switch turns on. Current flows through the loop of the main capacitor C1, the capacitor C2 and the magnetic switch SL2, and the charge stored in the capacitor C1 charges up the capacitor C2.

After that, when the time quadrature value of voltage V2 in capacitor C2 reaches the threshold value determined by the characteristics of the magnetic switch SL2, then the magnetic switch SL2 saturates and the magnetic switch turns on. Current flows through the loop of the main capacitor C2, the peaking capacitor Cp and the magnetic switch SL2, and the charge stored in the capacitor C2 charges up the peaking capacitor Cp.

As is clear from the explanation of FIG. 3, the corona discharge for pre-ionization occurs on the outer surface of the dielectric tube 12, based on the location of the contact between the dielectric tube 12 and the 2nd electrode 13. As the charging of the peaking capacitor Cp in FIG. 3 progresses, ultraviolet radiation is produced at the surface of the dielectric tube 12, and the laser gas which is the laser medium between the main discharge electrodes 2, 2 undergoes pre-ionization.

As the charging of the peaking capacitor Cp continues further, the voltage V3 of the peaking capacitor Cp climbs, and when this voltage V3 reaches a certain value (the breakdown voltage) Vb, the laser gas between the main discharge electrodes 2, 2 breaks down, and the main discharge begins. The laser medium is excited by this discharge, and a laser beam is produced. At that point the voltage of the peaking capacitor Cp drops sharply because of the main discharge, and the charging cycle returns to the beginning.

This discharge operation occurs repeatedly through the action of the solid-state switch SW, and so the pulse laser oscillation takes place at a fixed repetition rate.

The inductance of the various stages of the charge transfer circuit made up of the magnetic switches SL1, SL2 and the capacitors C1, C2 is set to decrease in the last stage, and so there is a pulse compression mechanism such that the pulse width of the current pulse becomes narrower in each stage. A strong discharge is achieved by the short pulse between the main discharge electrodes 2, 2.

In the case of an ArF excimer laser device used as a light source for exposure of semiconductors, the gap between the main electrodes 2, 2 must be about 14 to 18 mm, and about 550 to 750 mm in length.

For pulse stretching under the principle described above, the capacity of the peaking capacitor Cp must be less than 10 nF.

Thus, it is necessary that there be a rise time in the range of 30 to 80 ns before breakdown of the voltage impressed on the main discharge electrodes 2, 2. The rise time to the breakdown voltage Vb is defined by taking the steepest part of the rise in the first half cycle when the voltage V3 is impressed on the main discharge electrodes 2,2 to be a straight line, and measuring from the point where that straight line would cross the zero voltage line to the point when the breakdown voltage Vb is reached.

The stray inductance in the loop formed by the peaking capacitor Cp and the main discharge electrodes 2, 2 (the discharge current circuit) of the excitation circuit of FIG. 3 should be kept as slight as possible, but in practice it cannot be reduced below about 4 to 8 nH.

If, in the case of ArF, 2.5 to 3.7 atmospheres of laser gas consisting of Ar+$F_2$+Ne is used, it is preferable that the pressure of the fluorine not exceed 0.1% of the total pressure of the laser gas.

Moreover, if Cn is the capacitance of the final stage capacitor in the magnetic pulse compression circuit (capacitor C2 in FIG. 3), it is necessary that the ratio of Cp to Cn be in the range 0.45<Cp/Cn<0.75.

Moreover, it is preferable that the capacitance of the pre-ionization capacitor Cc be no more than b 5% of Cp.

Moreover, it is preferable that the reflectivity of the output mirror 6 of the optical resonator be 50% or higher.

Moreover, it is preferable that the number of round trips (by the laser beam back and forth in the optical resonator) be 6 or more.

Figure 4:
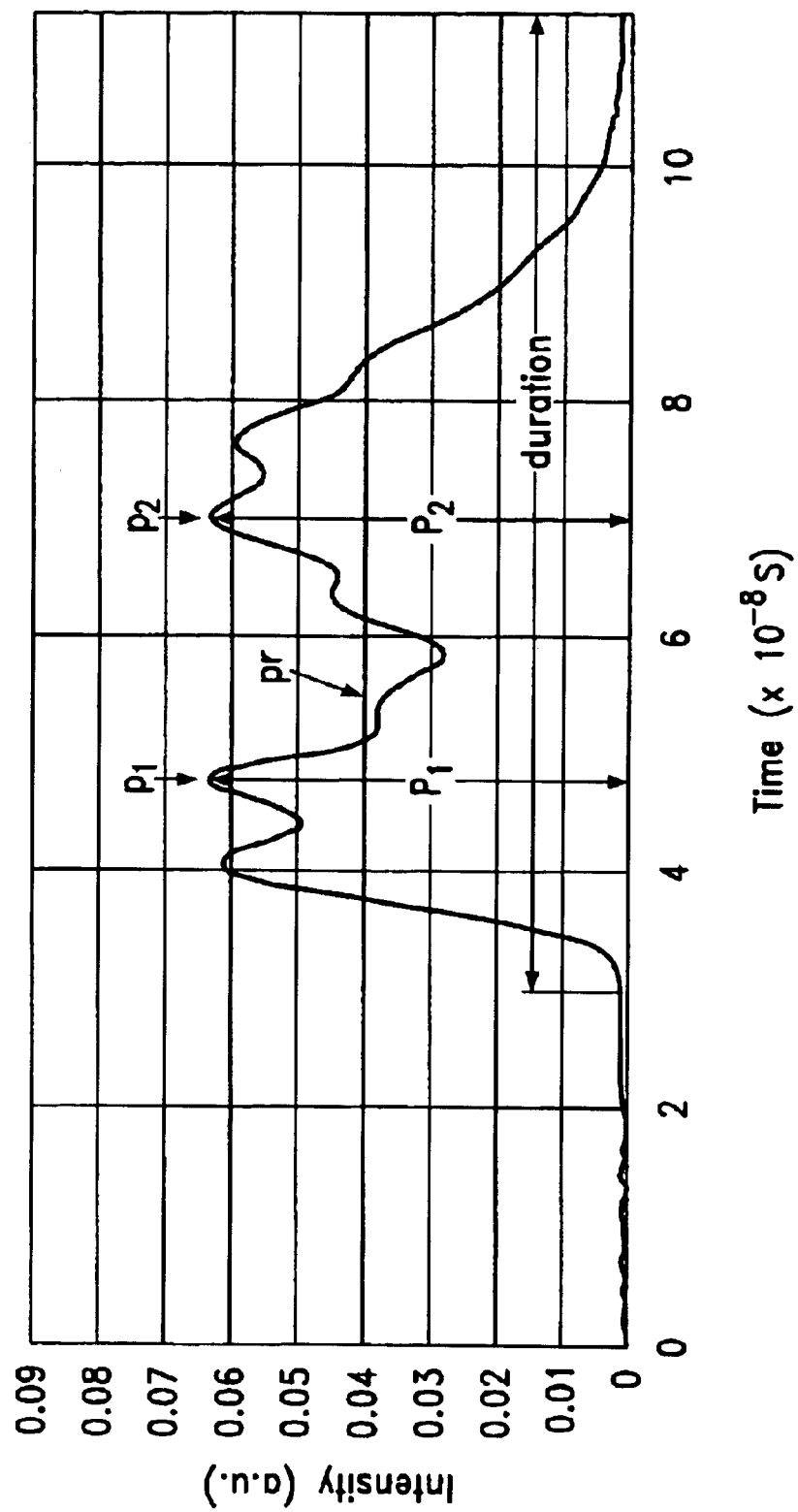
FIG. 4 is a diagram showing bifurcated laser pulse waveform obtained from ArF excimer laser device in one concrete example.

In this way, it is possible to realize a high repetition rate, stretched pulse, narrow line width ArF excimer laser as in JPO Patent Application H11-362688, with a repetition rate of 2 kHz or higher, a laser pulse width $T_{is}$ of 40 ns or greater as defined by formula (3), a laser pulsewidth FWHM of 20 ns or greater and duration (time from the beginning to the end of laser pulse oscillation; see FIG. 4) of 50 ns or greater.

The ArF excimer laser device of this invention takes the pulse stretching of JPO Patent Application H11-362688 as its premise, and then further narrows the spectrum line width.

The following explanation is premised on the explanation connected with FIGS. 1 through 3. As stated above, the combined oscillating current shown in FIG. 1 has the same polarity in the first half cycle and the third half cycle. The currents combine and the intensity is greater, and the energy injected into the discharge space is greater and the oscillation energy is greater than in the conventional case where there is no secondary current. In the 2nd half cycle of the oscillation current, however, the current value is smaller, therefore, the energy injected is small. For that reason, under the principles of JPO Patent Application H11-362688, the output waveform of a laser pulse oscillated from the ArF excimer laser device is actually a bifurcated waveform with a front half peak p1 and a later half peak p2, as shown in FIG. 4. The front half peak p1 corresponds to the first half cycle of combined oscillation current in FIG. 1, and the later half peak p2 corresponds to the third half cycle. The valley between them corresponds to the second half cycle of oscillation current. Now, the peak pr of the small, short ripple that is combined with the waveforms of the two big peaks p1, p2 is an output waveform peak that corresponds to a round-trip. The interval between these output waveform peaks pr that correspond to round trips is twice the length of the resonator divided by the speed of light.

Figure 5:
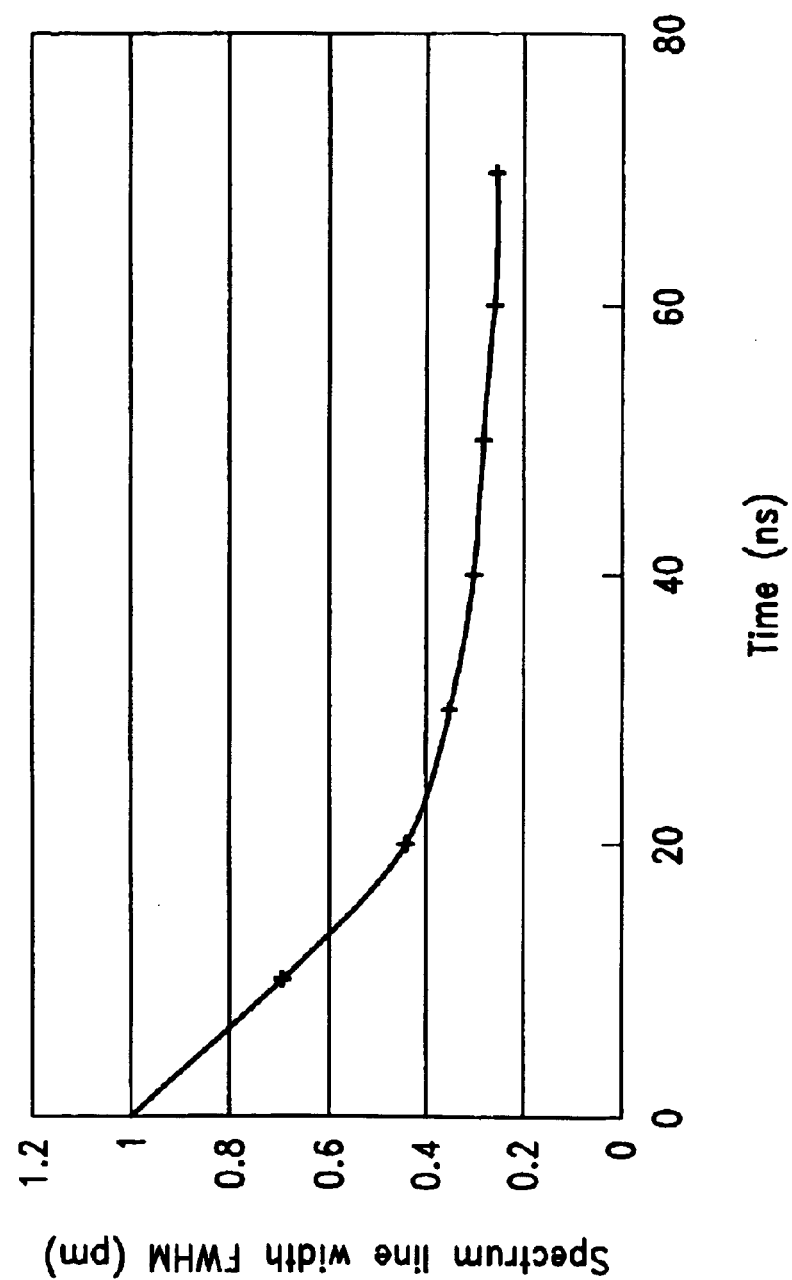
FIG. 5 is a diagram showing results of investigation of changes in spectrum line width of oscillating laser beam over time from beginning of oscillation in bifurcated laser pulse waveform.

FIG. 5 shows the results of investigation of changes in the spectrum line width FWHM of the oscillation laser beam over time in the initial oscillation of this bifurcated laser pulse waveform. It is clear from this figure that the spectrum line width narrows with the passage of time of the laser pulse waveform. That means that within a single pulse, the spectrum line width of the laser is relatively broad when it begins to oscillate but becomes narrower as time passes. The fact that the spectrum line width becomes smaller as time passes is because the number of round-trips by the oscillating laser beam within the resonator increases with time, and that can be explained logically in terms of principles.

Figure 6:
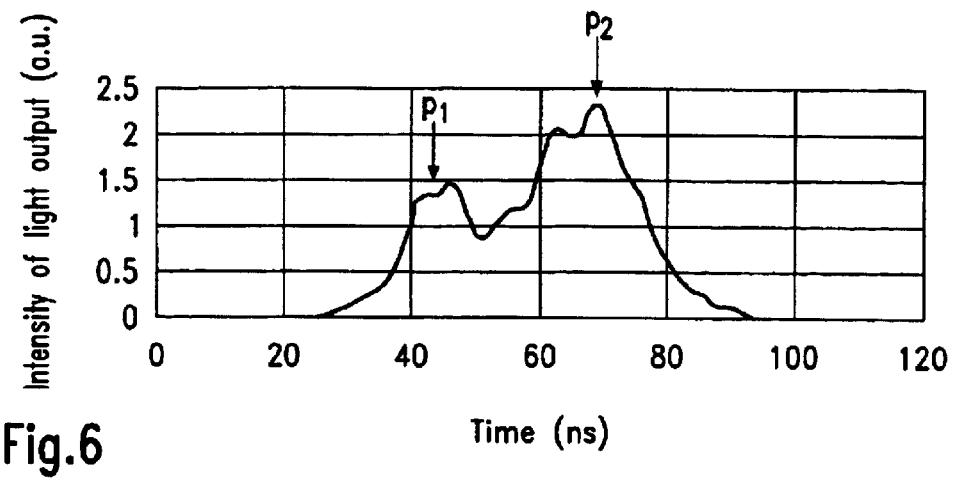
FIG. 6 is a diagram showing bifurcated laser pulse waveform obtained from ArF excimer laser device in one implementation of this invention.
Figure 7:
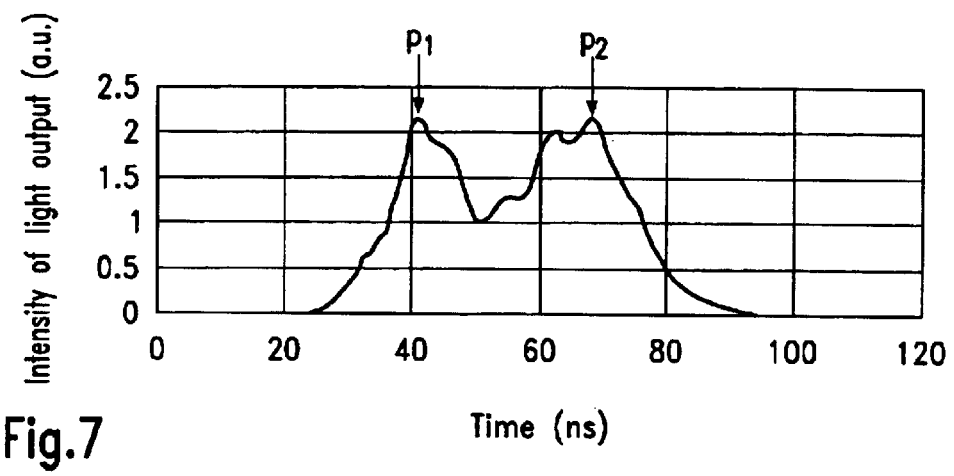
FIG. 7 is a diagram showing bifurcated laser pulse waveform obtained from ArF excimer laser device in another implementation of this invention.
Figure 8:
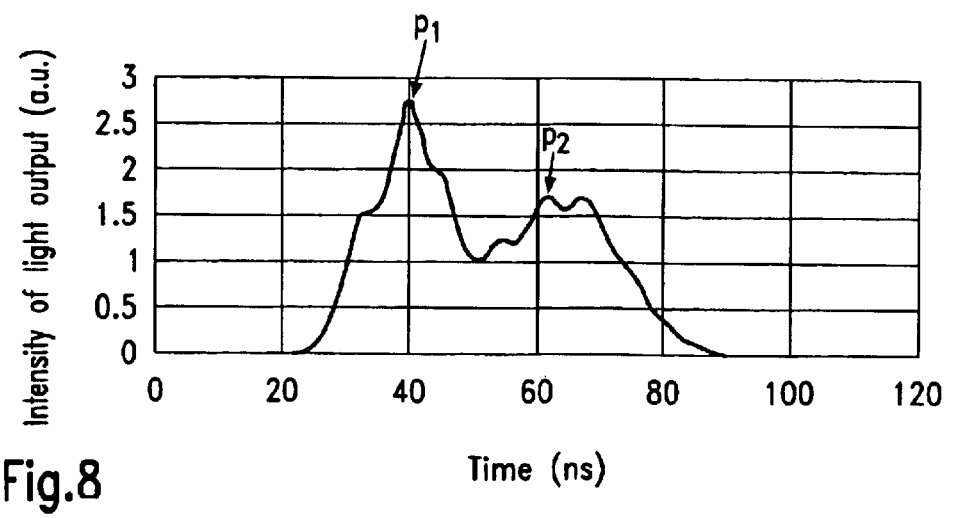
FIG. 8 is a diagram showing bifurcated laser pulse waveform obtained from ArF excimer laser device in control case for this invention.

The relationship in FIG. 5, as in FIGS. 6, 7 and 8, makes it clear that even though there are changes in the bifurcated waveform, it is dependent on time alone.

From these results it can be predicted that, in bifurcated laser pulse waveforms, the average spectrum line width FWHM of one pulse will be narrowed in proportion to the size of the area of the later half peak p2 relative to that of the front half peak p1. In the case of an ArF excimer laser device as a light source for exposure of semiconductors, the narrower the average spectrum line width FWHM of a pulse is, the smaller the effect of chromatic aberration of the optical system will be. Therefore, it is preferable that the average spectrum line width FWHM of a pulse be as narrow as possible.

Formula (4) below defines, as a parameter to express the ratio of the area of the front half peak p1 and the area of the later half peak p2, the proportion of the later half peak p2 to the front half peak p1 when the height (peak value) of the front half peak is P1 and the height (peak value) of the later half peak p2 is $P_2$.

$$\text{(proportion of the pulse later half peak)} = P_2/(P_1+P_2) \times 100(\%) \quad (4)$$

Figure 9:
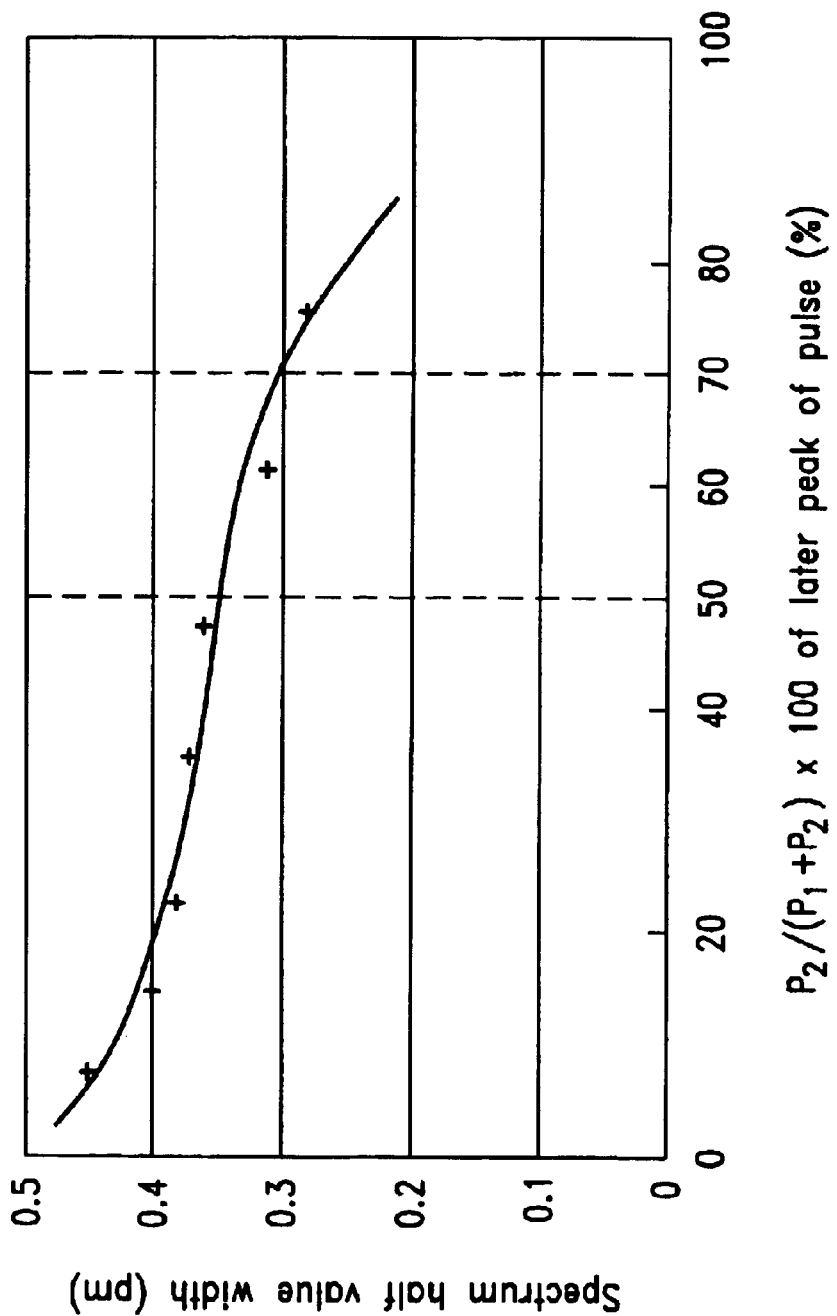
FIG. 9 is a diagram plotting spectrum line width relative to proportion of later half of pulse.

Changing the output waveform of the bifurcated laser pulse as in FIGS. 6, 7 and 8 results in the relationship plotted in FIG. 9 between the proportion of the pulse later half peak and the spectrum line width. Strictly speaking, the proportion of the pulse later half should be expressed as the ratio of areas rather than the ratio of peak values $P_2/(P_1+P_2)$, but formula (4) is a close approximation in the case of laser pulses obtained by using an oscillation current comprising the combined primary current and secondary currents that flow between the discharge electrodes.

From the results in FIG. 9, it is known that in order to make the spectrum line width FWHM in the output waveform of a laser pulse from an ArF excimer laser device no greater than 0.35 pm, as required for equipment for exposure of semiconductors, it will be necessary that the proportion of the pulse later half peak be at least 50%. Moreover, it is known that to make the spectrum line width FWHM no greater than 0.3 pm, it will be necessary that the proportion of the pulse later half peak be at least 70%.

Moreover, the greater the number of round trips as defined in formula (5), the more the resonance effect will narrow the spectrum line width FWHM, but because the length of the resonator is normally set at 1.2 to 1.5 m for ArF excimer laser equipment for exposing semiconductors, the lower limit for the number of round trips is 5 or more, and it is preferable to set a higher number.

$$\text{(round trips)} = \text{(pulse duration)}/\{2 \times \text{(resonator length)}/c\} \quad (5)$$

In order to increase the (proportion of the pulse later half peak) defined in formula (4), it is best to make a relative reduction in the proportion of the laser oscillation that is dependent on the primary current that injects energy from the magnetic pulse compression circuit through the peaking capacitor into the discharge electrodes. Parameters that can be varied to accomplish that include Cp/Cn, Ar concentration, total pressure of laser gas, gap between main discharge electrodes 2,2, and reflectivity of output mirror 6 of the optical resonator. These are explained below.

Figure 10:
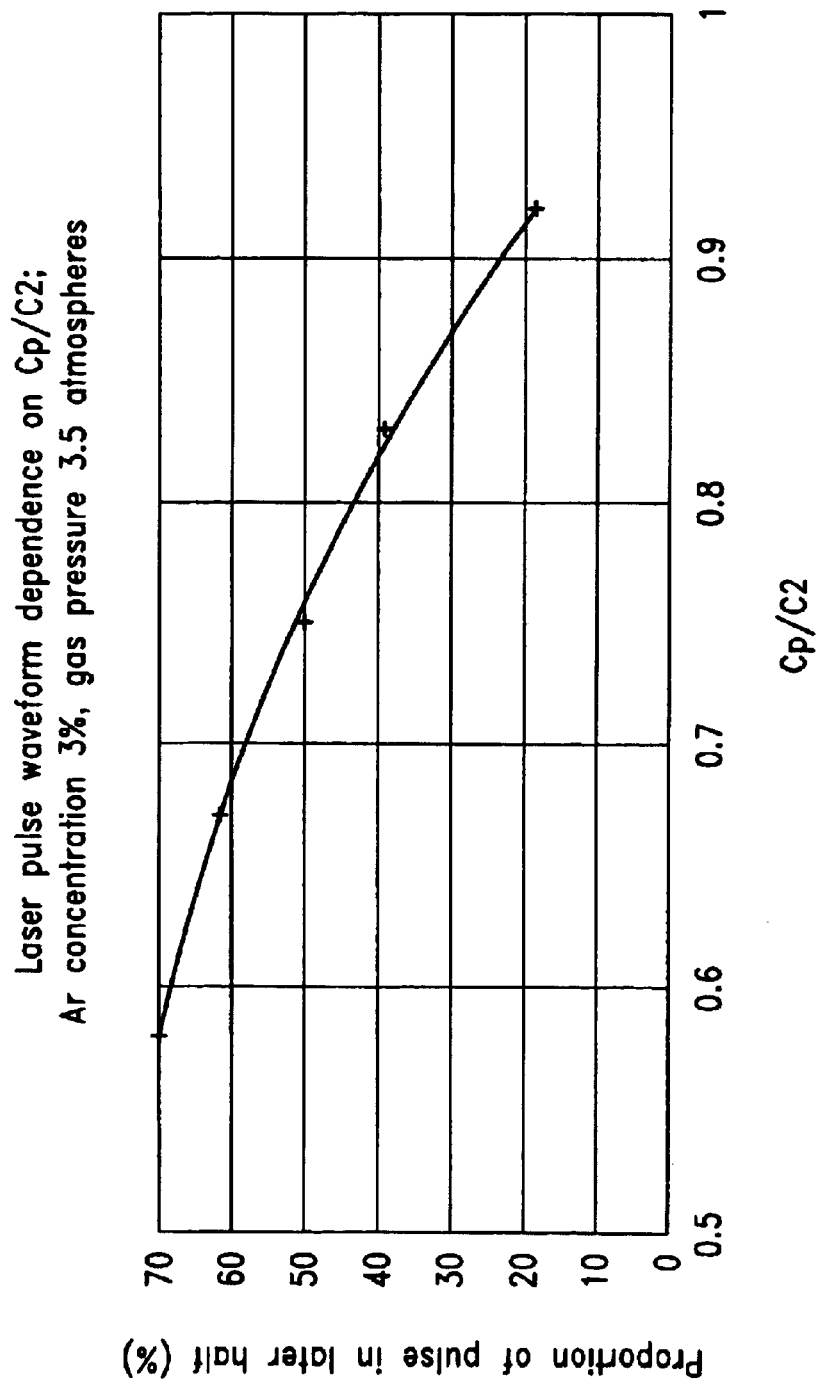
FIG. 10 is a diagram showing results of actual measurement of dependence of proportion of later half of pulse on Cp/C2.

Because the value of Cp/Cn is directly related to the primary current, reduction of the value of Cp means a relative decrease in the primary current, and so reducing Cp/Cn will increase the proportion of the pulse later half peak. FIG. 10 shows the results of actual measurement of dependence on Cp/Cn when the Ar concentration is 3% and the total gas pressure is 3.5 atmospheres. From the measured results, it can be said that in order to have the proportion of the pulse later half peak be 50% or greater, it is preferable that Cp/Cn be no greater than 0.75.

Figure 11:
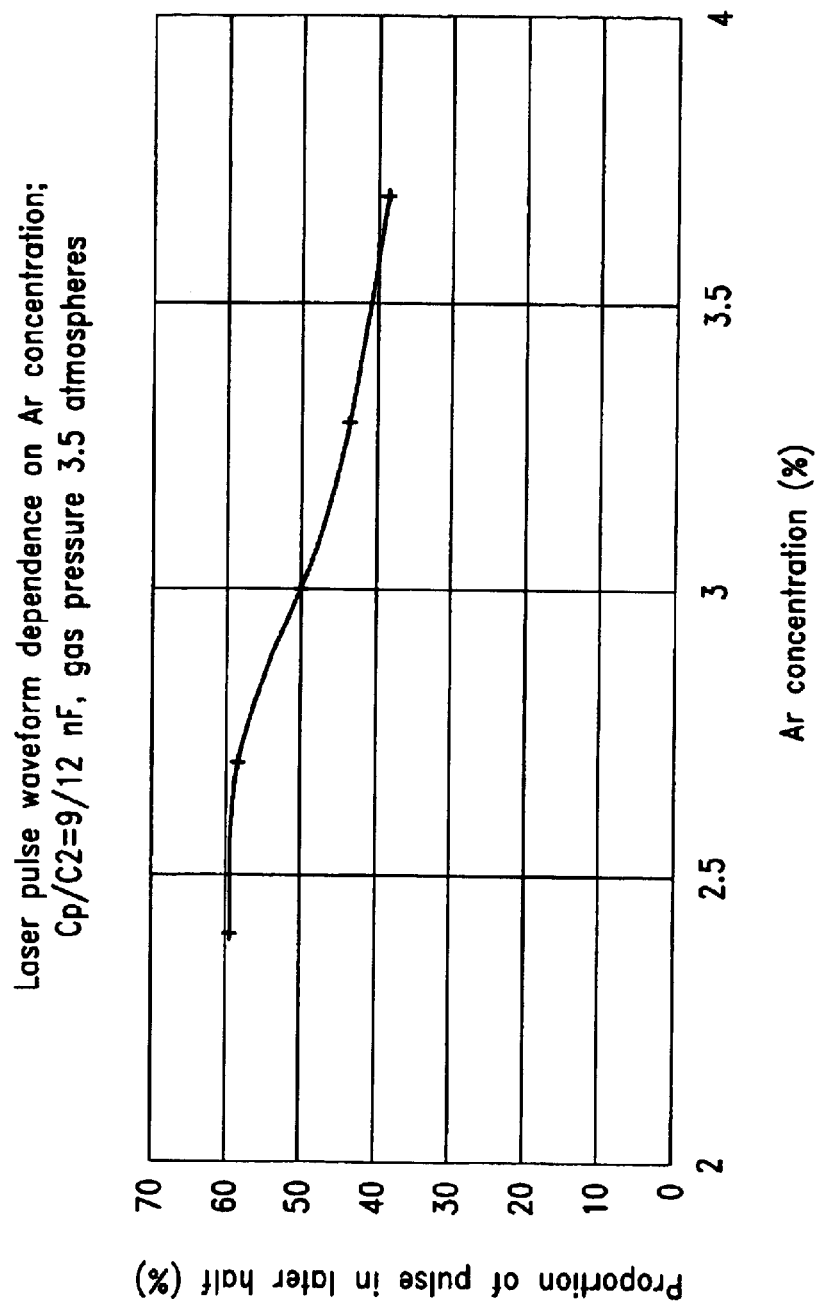
FIG. 11 is a diagram showing results of an actual measurement of the dependence of the proportion of a later half of a pulse on a concentration of Ar.

As for the concentration of Ar, reduction of the concentration of Ar gas will reduce the amount of excimer production, and so there will be a relative reduction of oscillation in the rise region, and the proportion of the pulse later half peak will increase. FIG. 11 shows the results of actual measurement of dependence on Ar concentration when Cp is 9 nF, C2 is 12 nF, and total gas pressure is 3.5 atmospheres. From the measured results, it can be said that to have the proportion of the pulse later half peak at 50% or greater, it is preferable that the concentration of Ar be no greater than 3%.

Figure 12:
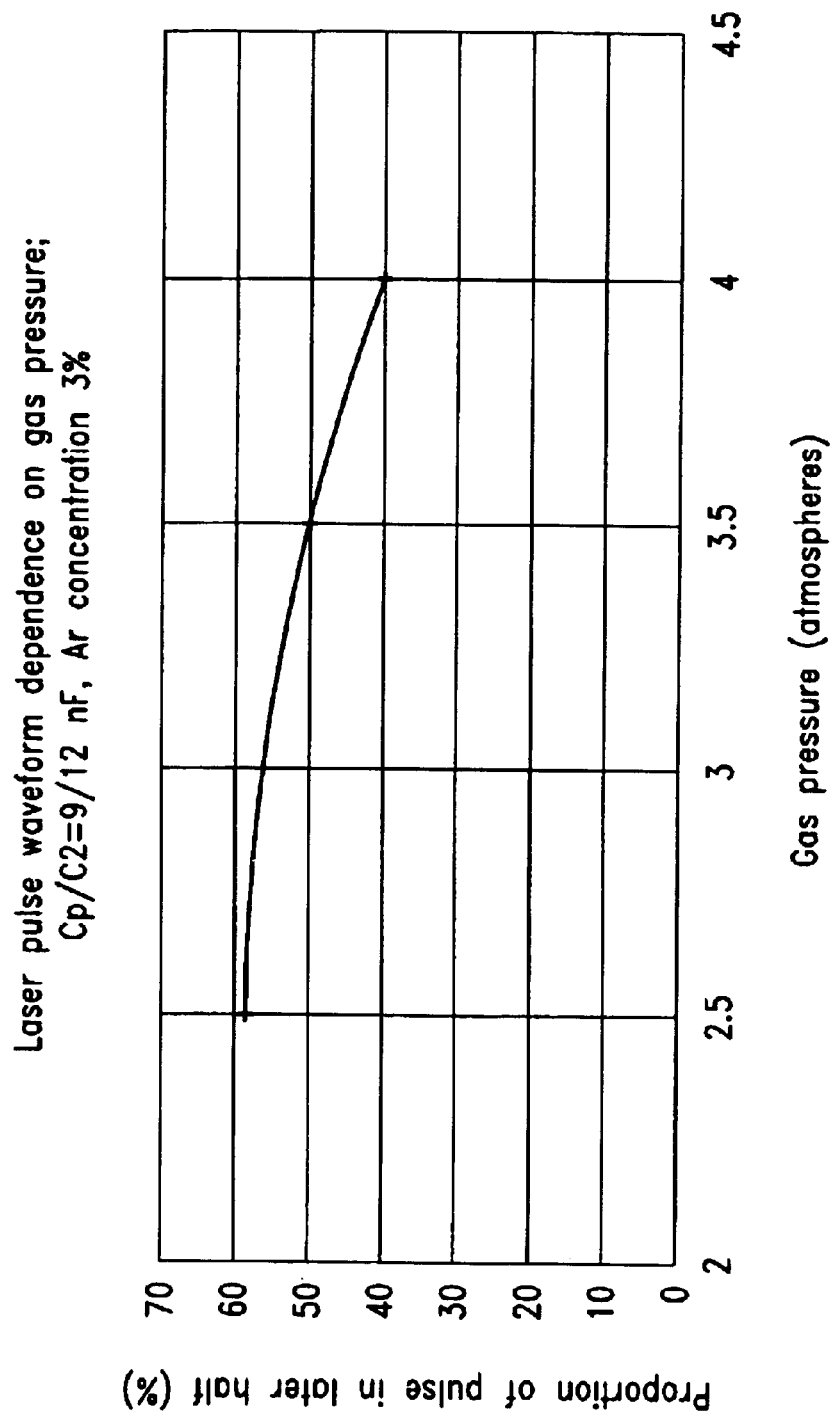
FIG. 12 is a diagram showing results of an actual measurement of the dependence of the proportion of a later half of a pulse on pressure of all gases.

With regard to the total gas pressure, the voltage at which discharge begins will drop as total gas pressure is reduced, and so there will be a relative reduction of the primary current. Therefore, when the total gas pressure is reduced, the proportion of the pulse later half peak increases. FIG. 12 shows the results of actual measurement of dependence on total gas pressure when Cp is 9 nF, C2 is 12 nF, and Ar concentration is 3%. From the measured results, it can be said that to have the proportion of the pulse later half peak at 50% or greater, it is preferable that the total gas pressure be no greater than 3.5 atmospheres.

As for the gap between the main discharge electrodes 2, 2, if the gap is d and the total gas pressure is P, then the voltage at which discharge begins will be roughly equal whenever the product of d and P is the same. Therefore, if the gap between the main discharge electrodes 2, 2 is narrowed, the voltage at which discharge begins will be lowered and there will be a relative decrease of the primary current. For that reason, if the gap between the main discharge electrodes 2, 2 is reduced, the proportion of the pulse later half peak increases. Specifically, on the basis of the pulse stretching described in JPO Patent Application H11-362688, it is preferable that the gap be in the range of 14 to 18 mm, and not greater than 17 mm.

Figure 13:
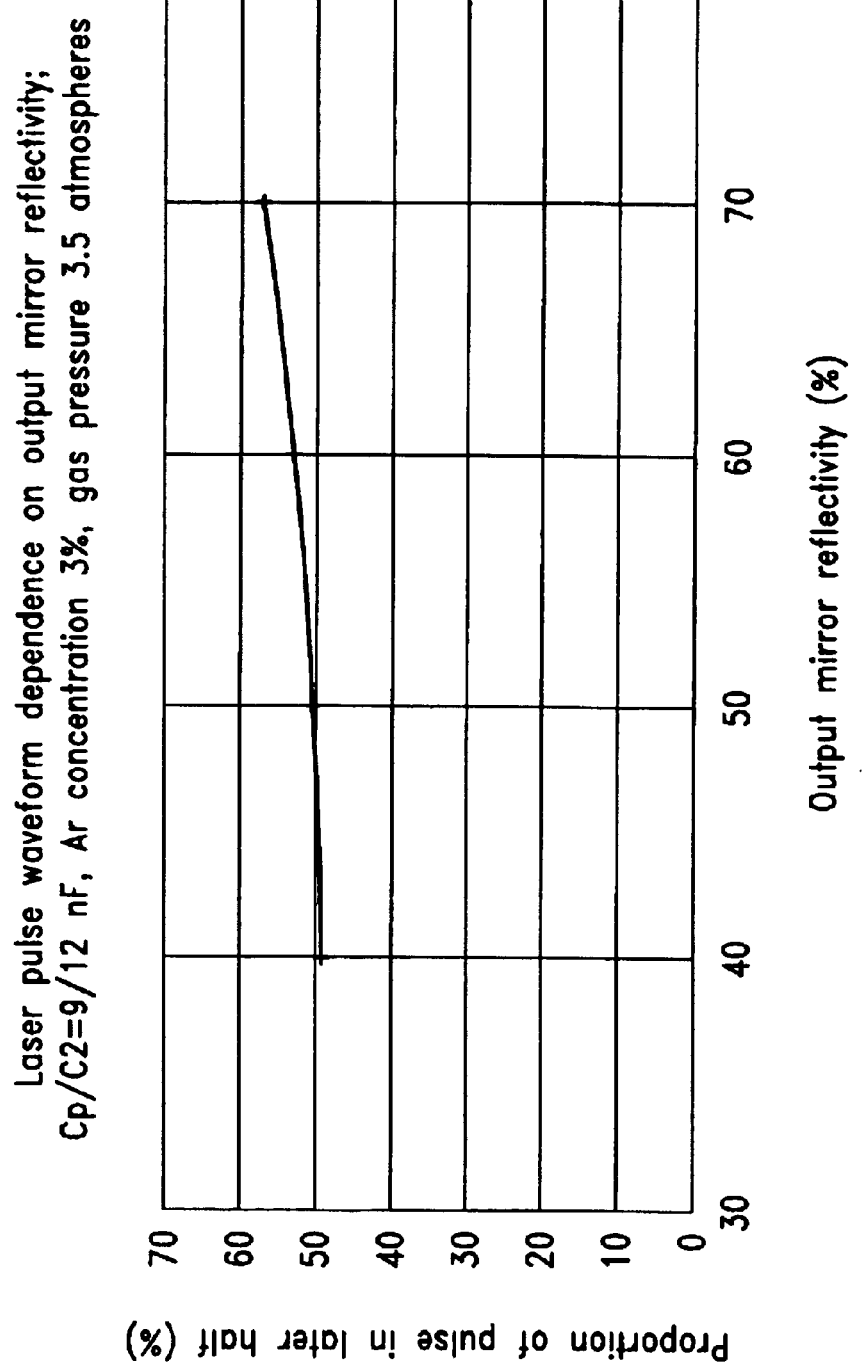
FIG. 13 is a diagram showing results of an actual measurement of the dependence of a proportion of the later half of a pulse on an output mirror reflectivity.

Further, with regard to the reflectivity of the output mirror 6 of the optical resonator, there is a relative increase of the time spent in the resonator as the reflectivity increases, and so the (proportion of the pulse later half peak) will increase. FIG. 13 shows the results of actual measurement of dependence on the reflectivity of the output mirror when Cp is 9 nF, C2 is 12 nF, Ar concentration is 3% and the total gas pressure is 3.5 atmospheres. From the measured results, it can be said that to have the proportion of the pulse later half peak at 50% or greater, it is preferable that the reflectivity of the output mirror be at least 50%.

By selecting the specified conditions above for one or more of the Cp/Cn, Ar concentration, total laser gas pressure, gap between main discharge electrodes 2, 2, and reflectivity of optical resonator output mirror 6, it is possible to make the proportion of the pulse later half peak 50% or greater.

The actual laser pulse waveforms based on this knowledge are shown in FIGS. 6, 7 and 8. In these examples, varying just Cp/C2 caused the proportion of the pulse later half peak to vary. In all of them, the Ar concentration is 3%, the total gas pressure is 3.5 atmospheres, the gap between the main discharge electrodes 2, 2 is 16 mm, the reflectivity of output mirror 6 is 60%, the concentration of fluorine (partial pressure) is 0.085%, pulse duration is 70 ns, and the FWHM of the laser pulse output waveform is 40 ns. In FIG. 6, Cp/C2=8 nF/12 nF=0.67, the proportion of the pulse later half peak is 62% and the spectrum line width FWHM is 0.31 pm. In FIG. 7, Cp/C2=9 nF/12 nF=0.75, the proportion of the pulse later half peak is 50% and the spectrum line width FWHM is 0.35 pm. In FIG. 8, Cp/C2=10 nF/12 nF=0.83, the proportion of the pulse later half peak is 39% and the spectrum line width FWHM is 0.36 pm. This confirms the significance of the value limits described above.

An ArF excimer laser device is explained above, but it is clear that the basic principles that have been explained also apply when the same discharge excitation is used in a fluorine laser device in which the laser gas is a mixed gas of fluorine ($F_2$) and a rare gas such as helium (He) as a buffer gas, or a KrF excimer laser device in which the laser gas is a mixed gas of fluorene ($F_2$), krypton (Kr) and a rare gas such as neon (Ne) as a buffer gas.

The ArF excimer laser device, fluorine laser device and KrF excimer laser device of this invention have been explained above on the basis of principles and examples, but the invention is not limited to the implementation described. Various other modes are possible.

As is clear from the explanation above, it is possible to realize an ArF excimer laser device which connects to the output terminal of a magnetic pulse compression circuit and which has a pair of laser discharge electrodes located within the laser chamber and a peaking capacitor connected in parallel with the pair of laser discharge electrodes, in which the output waveform of the laser pulse has a bifurcated form comprising a front half peak and a later half peak and, if the peak value of the front half peak is $P_1$ and the peak value of the later half peak is $P_2$ and the proportion of the pulse later half peak=$P_2/(P_1+P_2)\times 100(\%)$ then the proportion of the pulse later half peak is 50% or more. This device has a spectrum line width FWHM narrowed to 0.35 pm or less, and is suitable for exposure of semiconductors. Moreover, this invention makes longer than normal pulses possible in KrF excimer laser devices and fluorine laser devices.

What is claimed is:

1. An ArF excimer laser device which connects to an output terminal of a magnetic pulse compression circuit comprising:

a pair of laser discharge electrodes located within the laser chamber;

a peaking condenser connected in parallel with the pair of laser discharge electrodes; and a means for providing an output waveform of the laser pulse having a bifurcated form comprising a front half peak and a back half peak, wherein, if the peak value of the front half peak is $P_1$ and the peak value of the back half peak is $P_2$ and the (proportion of the pulse back half peak)=$P_2/(P_1+P_2)\times 100(\%)$, then the (proportion of the pulse back half peak) is 50% or more.

2. The ArF excimer laser device as claimed in claim 1, further comprising means for providing a primary current that injects energy from the magnetic pulse compression circuit through the peaking condenser into the discharge electrodes; and a means for providing secondary current that injects energy into the discharge electrodes from a condenser used to charge the peaking condenser in the final stage of the magnetic pulse compression circuit, wherein the primary current and secondary current are combined, and wherein a resonance cycle of the secondary current is set at 3 to 6 times a resonance cycle of the primary current, such that a first half cycle of the discharge resonance current waveform of the primary current combined with the secondary current, when it reverses polarity, and the succeeding 2 half cycles form one pulse of laser oscillation activity.

3. The ArF excimer laser device as claimed in claim 1, wherein a FWHM of the laser pulse output waveform is 20 ns or longer, and a persistence of the output laser pulse is 50 ns or longer.

4. The ArF excimer laser device as claimed in claim 1, wherein the number of round trips in the beam resonator is five or more.

5. The ArF excimer laser device as claimed in claim 1, wherein the magnetic pulse compression circuit has a magnetic pulse compression section comprising a semiconductor switch and one or more stages of condenser and magnetic switch, and the capacitance Cp of the peaking condenser and the capacitance Cn of a condenser that charges the peaking condenser in the final stage of the magnetic pulse compression circuit are in a proportion such that Cp/Cn does not exceed 0.75.

6. The ArF excimer laser device as claimed in claim 1, further comprising means for providing a partial pressure of Ar in the laser chamber that is 3% or less.

7. The ArF excimer laser device as claimed in claim 1, further comprising means for providing a pressure of all gases in the laser chamber that is 3.5 atmospheres or less.

8. The ArF excimer laser device as claimed in claim 1, wherein the inter-electrode gap of the discharge electrodes is no more than 17 mm.

9. The ArF excimer laser device as claimed in claim 1, wherein reflectivity of an output mirror of a beam resonator located in the laser chamber is at least 50%.

10. The ArF excimer laser device as claimed in claim 1, wherein the magnetic pulse compression circuit has a magnetic pulse compression section comprising a semiconductor switch and one or more stages of a condenser and a magnetic switch;

an inductance of a circuit loop comprising the peaking condenser and the main discharge electrodes is from 4 to 8 nH;

a total gas pressure in the laser chamber is from 2.5 to 3.7 atmospheres;

a partial pressure of fluorine is no more than 0.1%;

a rise time until breakdown of the voltage impressed on the main discharge electrodes is from 30 to 80 ns; and a capacitance Cp of the peaking condenser and a capacitance Cn of a condenser that charges the peaking condenser in the final stage of the magnetic pulse compression circuit are in a proportion such that $0.45 < Cp/Cn < 0.75$.

11. The ArF excimer laser device as claimed in claim 10, wherein the capacitance Cp of the peaking condenser is less than 10 nF.

12. A fluorine laser device which connects to an output terminal of a magnetic pulse compression circuit comprising:

a pair of laser discharge electrodes located within a laser chamber;

a peaking condenser connected in parallel with the pair of laser discharge electrodes; and a means for providing an output waveform of the laser pulse, wherein the output waveform of the laser pulse has a bifurcated form comprising a front half peak and a back half peak and, if the peak value of the front half peak is $P_1$ and the peak value of the back half peak is $P_2$ and the (proportion of the pulse back half peak)=$P_2/(P_1+P_2) \times 100 (\%)$, then the (proportion of the pulse back half peak) is 50% or more.

13. The fluorine laser device as claimed in claim 12, further comprising a means for providing a primary current that injects energy from the magnetic pulse compression circuit through the peaking condenser into the discharge electrodes;

and a means for providing a secondary current that injects energy into the discharge electrodes from a condenser used to charge the peaking condenser in the final stage of the magnetic pulse compression circuits, wherein the primary current and secondary current are combined, and wherein a resonance cycle of the secondary current is set at 3 to 6 times a resonance cycle of the primary current, such that the first half cycle of the discharge resonance current waveform of the primary current combined with the secondary current, when it reverses polarity, and the succeeding 2 half cycles form one pulse of laser oscillation activity.

14. A KrF excimer laser device which connects to an output terminal of a magnetic pulse compression circuit comprising:

a pair of laser discharge electrodes located within a laser chamber;

a peaking condenser connected in parallel with the pair of laser discharge electrodes; and a means for providing an output waveform of the laser pulse, wherein the output waveform of the laser pulse has a bifurcated form comprising a front half peak and a back half peak and, if the peak value of the front half peak is $P_1$ and the peak value of the back half peak is $P_2$ and the (proportion of the pulse back half peak) =$P_2/(P_1+P_2) \times 100(\%)$, then the (proportion of the pulse back half peak) is 50% or more.

15. The KrF excimer laser device as claimed in claim 14, further comprising a means for providing a primary current that injects energy from the magnetic pulse compression circuit through the peaking condenser into the discharge electrodes; and a means for providing a secondary current that injects energy into the discharge electrodes from a condenser used to charge the peaking condenser in the final stage of the magnetic pulse compression circuits, wherein the primary current and secondary are combined, and wherein a resonance cycle of the secondary current is set at 3 to 6 times a resonance cycle of the primary current, such that the first half cycle of the discharge resonance current waveform of the primary current combined with the secondary current, when it reverses polarity, and the succeeding 2 half cycles form one pulse of laser oscillation activity.

* * * * *